United States Patent
Lew

Patent Number: 4,458,421
Date of Patent: Jul. 10, 1984

[54] COUNTER-RECIPROCATING DOUBLE BLADE SAW

[76] Inventor: Hyok S. Lew, 7890 Oak St., Arvada, Colo. 80005

[21] Appl. No.: 384,048

[22] Filed: Jun. 1, 1982

[51] Int. Cl.³ .................. B27B 19/04; B27B 19/09
[52] U.S. Cl. .................................. 30/369; 30/392
[58] Field of Search ...................... 30/369, 392, 393

[56] References Cited

U.S. PATENT DOCUMENTS 2,283,958  5/1942  Tompkins .................... 30/369

FOREIGN PATENT DOCUMENTS 123375  2/1919  United Kingdom .............. 30/392

Primary Examiner—E. R. Kazenske
Assistant Examiner—Douglas D. Watts

[57] ABSTRACT

This invention relates to the counter-reciprocating double blade saws including a pair of the saw blades disposed in side by side relationship, one extremity of each of the two saw blades is connected to two counter-reciprocating holders driven by a power source, respectively, which arrangement is for the counter-reciprocating double blade saw of the saber saw type. The other extremities of the two saw blades connected to two reciprocating saw blade holders at their one extremities are connected to a pair of the idler counter-reciprocating saw blade holders supported by the common frame that also supports the drive counter-reciprocating saw blade holders in the construction of the counter-reciprocating double blade saw of the bow saw or butcher saw type. The counter-reciprocating double blade saw of the two-man type saw is constructed when said common frame is removed in the counter-reciprocating double blade saw of the bow or butcher saw type and a pair of handles are added to two opposite extremities.

3 Claims, 4 Drawing Figures

COUNTER-RECIPROCATING DOUBLE BLADE SAW

BACKGROUND OF THE INVENTION

Both of two different types of the portable powered saws being used extensively at present have the defficiencies. The powered chain saws are wasteful in terms of the energy consumption as well as in terms of the material wasted by the wide swath of the cut. The powered saber saws have only limited applications because of the shortness of the saw blades and the highly oscillatory mode of the operation.

SUMMARY

The primary object of the present invention is to provide counter-reciprocating double blade saws of the saber saw type wherein the oscillatory mode of the saber saw operation is completely eliminated.

Another object of the present invention is to provide conter-reciprocating double blade saws of the bow saw or the butcher saw type wherein the tension on the saw blade is maintained to provide rigidity in operation.

A further object of the present invention is to provide counter-reciprocating double blade saws of the two-man saw type that can be used in cutting a stock of a large diameter.

These and the other objects of the present invention will become clear as the description of the present invention proceeds. The present invention may be described with great clarity and specificity by referring to the following Figures.

DESCRIPTION OF THE PREFERRED EMBODYMENTS

Figure 1:
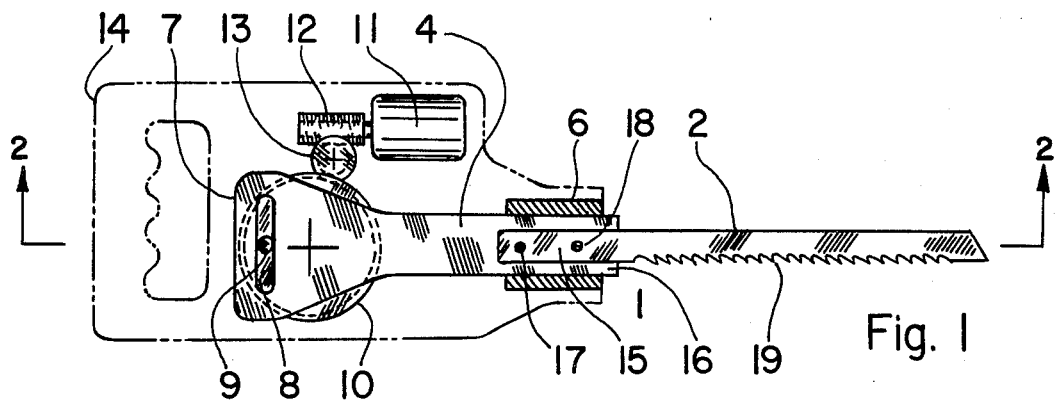
FIG. 1 illustrates a cross section of a counter-reciprocating double blade saw constructed in accordance with the principles of the present invention.

In FIG. 1 there is shown a cross section of a counter-reciprocating double blade saw 1 constructed in accordance with the principles of the present invention, which cross section is taken along a plne bisecting the counter-reciprocating double blade saw 1 into two equal halves including each of two counter-reciprocating saw blades, respectively. The first saw blade 2 of two counter-reciprocating saw blades is removably affixed to one extremity 16 of the first counter-reciprocating saw blade holder 4 engaging a bushing 6 in a sliding relationship. The other extremity 7 of the first counter-reciprocating saw blade holder 4 includes a slotted opening 8 disposed along a direction substantially perpendicular to the length of the first saw blade 2, which slotted opening 8 is slidably engaged by the first cam roller 9 extending from one face of the first drive wheel 10 wherein the first cam roller 9 orbits about the central axis of the first drive wheel 10 when it is rotated by the power source 11 by means of the worm gear 12 and a pinion gear 13 engaging the spur gear teeth disposed on the rim of the drive wheel 10. The first drive wheel 10, the pinion gear 13 and the worm gear 12 are rotatably supported by the handle frame 14 while the bushing 6 is rigidly supported by the handle frame 14. It is readily understood that the drive wheel 10 plays the role of a fly-wheel in addition to inducing the reciprocating motion on the first counter-reciprocating saw blade holder 4. The saw blade 2 is removably affixed to the extremity 16 of the counter-reciprocating saw blade holder 4 in a snapping relationship by means of the pair of the locking pins 17 and 18 snapping into the pair of the matched holes included in the saw blade 2 near one extremity 15, which locking pins 17 and 18 are affixed to the flat face included in the extremity 16 of the counter-reciprocating saw blade holder 4 having a semicircular cross section. The teeth 19 of the saw blade 2 are pointing away from the counter-reciprocating saw blade holder 4 in an oblique angle.

Figure 2:
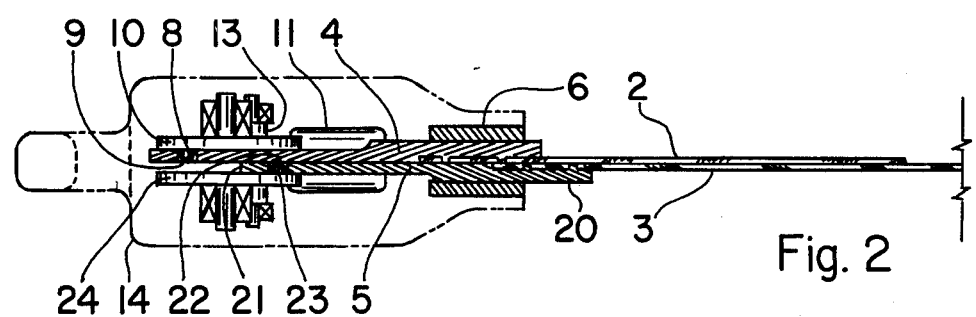
FIG. 2 illustrates the cross section 2—2 of the counter-reciprocating double blade saw as shown in FIG. 1 wherein the one half of both halves of said counter-reciprocating double blade saw is shown.

In FIG. 2 there is shown the cross section 2—2 of the counter-reciprocating double blade saw 1 as shown in FIG. 1 wherein one half of both halves of said counter-reciprocating double blade saw is shown. The other half of the counter-reciprocating double blade saw 1 mated to the half shown in FIG. 1 includes the second saw blade 3 removably affixed to one extremity 20 of the second counter-reciprocating saw blade holder 5, which extremity 20 having a semicircular cross section engages the bushing 6 in a sliding relationship. The other extremity 21 of the second counter-reciprocating saw blade holder 5 includes a slotted opening 22 slidably engaged by the second cam roller 23 rigidly extending from one face of the second drive wheel 24, which second cam roller 23 orbits about the central axis of the second drive wheel 24 when it is rotated by the same power source 11 by means of the same worm gear 12 and the same pinion gear 13 engaging the spur gear teeth disposed on the rim of the second drive wheel 24. The first and second cam rollers 9 and 23 respectiveldy driving the first and second counter-reciprocating saw blade holders 4 and 5 are disposed at two diametrically opposite positions with respect to the common central axis of the first and second drive wheels 10 and 24. As a consequence, the first and second counter-reciprocating saw blade holders 4 and 5 as well as the first and second saw blades 2 and 3 affixed to said counter-reciprocating saw blade holders reciprocate in two opposite directions relative to one another in the direction parallel to the length of said saw blades when the power source is activated. The second saw blade 3 is removably affixed to the second counter-reciprocating saw blade holder 5 in the same manner as the first saw blade 2 removably is affixed to the first counter-reciprocating saw blade holder 4 as described in conjunction with FIG. 1. The teeth included in the second saw blade are pointed toward to the second counter-reciprocating saw blade holder 5 in an oblique angle, which is the opposite to the teeth included in the first saw blade 2 connected to the first counter-reciprocating saw blade holder 4. Since the motion of every moving part included in the counter-reciprocating double blade saw 1 counteracts another part and the reaction of cutting by two counter-reciprocating saw blades are neutralized by two set of teeth pointed in two opposite directions in an oblique angle respectively included in said two counter-reciprocating saw blades, there is no resultant reaction felt by the user of said counter-reciprocating double blade saw. Therefore, a smooth and efficient cutting action is obtained by the counter-reciprocating double blade saw of the present invention, which is described by the illustrative embodiment shown in FIGS. 1 and 2. It is obvious that many other mechanical arrangements for creating the counter-reciprocating motion on two saw blades included in the present invention can be employed which is different from the arrangement shown by the illustrative embodiment of FIGS. 1 and 2.

Figure 3:
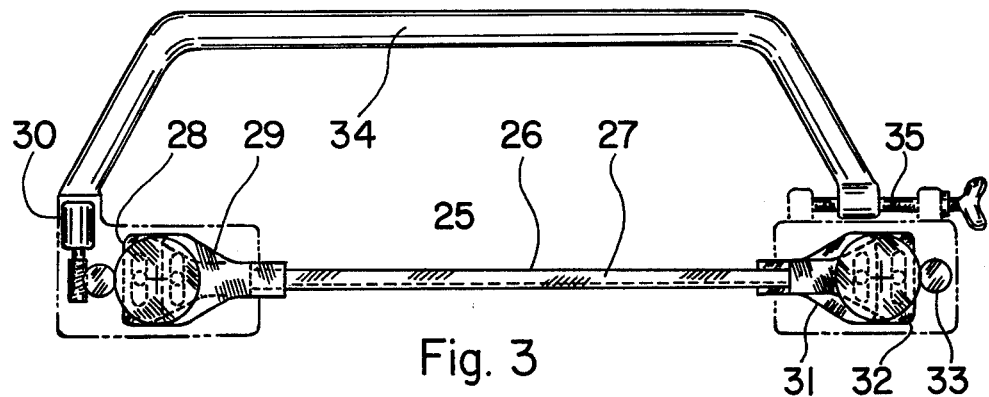
FIG. 3 illustrates another counter-reciprocating double blade saw having a bow-like frame providing tension on two counter-reciprocating saw blades.

In FIG. 3 there is shown another counter-reciprocating double blade saw 25 including a pair of the saw blades 26 and 27 respectively connected to a pair of the counter-reciprocating saw blade holders 28 and 29 at one extremitie, which are driven by the same mechanical arrangement as that illustrated in FIGS. 1 and 2. The other extremities of said pair of the saw blades 26 and 27 are respectively connected to a pair of idling counter-reciprocating saw blade holders 31 and 32 arranged exactly the same way as the driving counter-reciprocating saw blade holders 4 and 5 included in the counter-reciprocating double blade saw 1 with the exception of the power source. As a matter of face, the idling end assembly including the pair of the counter-reciprocating saw blade holders 31 and 32 is a mirror image of the driving end assembly including the pair of counter-reciprocating saw blade holders 28 and 29 driven by the power source 30 when said driving end is rotated 180 degree about an axis parallel to the length of the saw blades 26 and 27 and the power source 30 is removed. Said driving end and the idling end assemblies are supported by a bow-like rigid structure 34 including a means 35 for tensioning the saw blades 26 and 27, which bow-like rigid structure 34 is also used as the handle in operating the counter-reciprocating double blade saw 25. The means 35 for imposing a tension on the saw blades 26 and 27 may be of the same arrangement as those commonly employed in the present day bow-saws and hack-saws. It can be easily recognized that the pinion gear 33 coupling the pair of the idling wheels linked to the pair of the counter-reciprocating saw blade holders 31 and 32 can be eliminated by directly coupling said two idling wheels to one another and installing the cam followers slidably engaging the slotted openings included in the pair of the counter-reciprocating saw blade holders 31 and 32 on two opposite outer faces of said idling wheel.

Figure 4:
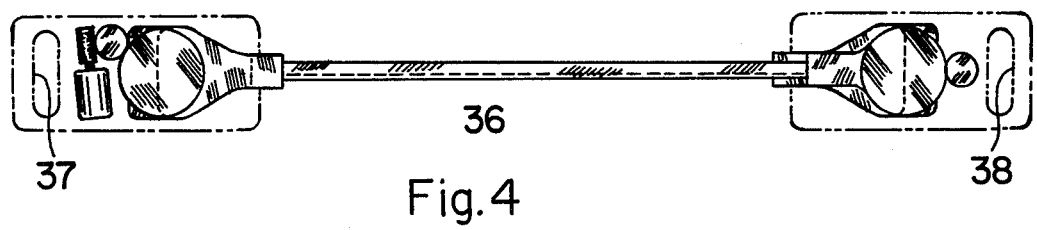
FIG. 4 illustrates a further counter-reciprocating double blade saw having two independent handles at two extremities of two counter-reciprocating saw blades.

In FIG. 4 there is illustrated a further counter-reciprocating double blade saw 36 constructed in exactly the same way as the counter-reciprocating double blade saw 25 of FIG. 3 less the bow-like rigid structure. In place of said bow-like rigid structure, a pair of the handles 36 and 37 are included at two opposite extremities of the counter-reciprocating double blade saw 36; whereby, the counter-reciprocating double blade saw 36 can be operated by a two men team sawing stock of a large diameter.

While the principles of the present invention have now been made clear by the illustrative embodiment, it will be immediately obvious to those skilled in the art that many modifications of the structure, arrangement, proportion, elements and the material which are particularly adaptable to the specific working environment and operating condition are possible without departing from those principles of the present invention.

I claim:

1. A counter-reciprocating double blade saw with means for synchronizing the motion of two counter-reciprocating saw blades disposed at both extremities of counter-reciprocating double blade saw, said counter-reciprocating double blade saw comprising in combination:
   (a) a first saw blade disposed intermediate a first saw blade holder of the driving end and a first saw blade holder of the idling end wherein each of two extremities of said first saw blade is removably held under tension by one extremity of said first saw blade holder of the driving end and one extremity of said first saw blade holder of the idling end;
   (b) a second saw blade disposed parallel and adjacent to said first saw blade and intermediate a second saw blade holder of the driving end and a second saw blade holder of the idling end wherein each of two extremities of said second saw blade is removably held under tension by one extremity of said second saw blade holder of the driving end and one extremity of said second saw blade holder of the idling end;
   (c) said first saw blade holder of the driving end including a slotted opening disposed at the other extremity of said first saw blade holder of the driving end on a plane substantially parallel to the plane including said first saw blade and in a direction substantially perpendicular to the length of said first saw blade, said one extremity of said first saw blade holder of the driving end engaging and extending through a first bushing in a sliding relationship in the direction parallel to said first and second saw blades;
   (d) said second saw blade holder of the driving end including a slotted opening disposed at the other extremity of said second saw blade holder of the driving end on a plane substantially parallel to the plane including said second saw blade and in a direction substantially perpendicular to the length of said second saw blade, said one extremity of said second saw blade holder of the driving end engaging and extending through said first bushing in a sliding relationship in the direction parallel to said first and second saw blades;
   (e) a first cam roller slidably engaging said slotted opening included in said first saw blade holder of the driving end and disposed orbitably about a first axis substantially perpendicular to the plane including said first saw blade;
   (f) a second cam roller slidably engaging said slotted opening included in said second saw blade holder of the driving end and disposed orbitably about said first axis in unison with said first cam roller at the diametrically opposite position from said first cam roller;
   (g) a power drive mechanically linked to said first and second cam rollers creating said orbiting motion about said first axis;
   (h) said first saw blade holder of the idling end including a slotted opening disposed at the other extremity of said first saw blade holder of the idling end on a plane substantially parallel to the plane including said first saw blade and in a direction substantially perpendicular to the length of said first saw blade, said one extremity of said first saw blade holder of the idling end engaging and extending through a second bushing in a sliding relationship in the direction parallel to said first and second saw blades;

(i) said second saw blade holder of the idling end including a slotted opening disposed at the other extremity of said second saw blade holder of the idling end on a plane substantially parallel to the plane including said second saw blade and in a direction substantially perpendicular to the length of said second saw blade, said one extremity of said second saw blade holder of the idling end engaging and extending through said second bushing in a sliding relationship in the direction parallel to said first and second saw blades;

(j) a third cam roller slidably engaging said slotted opening included in said first saw blade holder of the idling end and disposed orbitably about a second axis substantially parallel to said first axis; and (k) a fourth cam roller slidably engaging said slotted opening included in said second saw blade holder of the idling end and disposed orbitably about said second axis in unison with said third cam roller at the diametrically opposite position from said third cam roller; whereby, the pulling action on said first saw blade by said first saw blade holder of the driving end generates a pulling action on said second saw blade by said second saw blade holder of the idling end and the pulling action on said second saw blade by said second saw blade holder of the driving end generates a pulling action on said first saw blade by said first saw blade holder of the idling end as the orbiting motion of said first and second cam rollers create the orbiting motion of said third and fourth cam rollers via alternatively pulling action of said first and second saw blades.

2. The combination as set forth in claim 1 wherein a pair of handles are disposed at said driving end and said idling end, respectively, said pair of handles being nonmovably secured to said first axis and said second axis, respectively.

3. The combination as set forth in claim 1 wherein a curved longitudinal member of a bow type structure nonmovably anchors said first central axis and said second central axis at each of two extremities of said curved longitudinal member, which curved longitudinal member including at least one handle disposed at one extremity of said curved longitudinal member and means for controlling the distance between said first central axis and second central axis.

* * * * *